(12) United States Patent
Ishida et al.

(10) Patent No.: US 7,798,927 B2
(45) Date of Patent: Sep. 21, 2010

(54) BELT-TYPE CONTINUOUSLY VARIABLE TRANSMISSION AND STRADDLE-TYPE VEHICLE

(75) Inventors: Yousuke Ishida, Shizuoka (JP); Akifumi Oishi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 545 days.

(21) Appl. No.: 11/776,391

(22) Filed: Jul. 11, 2007

(65) Prior Publication Data

US 2008/0015067 A1    Jan. 17, 2008

(30) Foreign Application Priority Data

Jul. 12, 2006   (JP)   ............... 2006-191132

(51) Int. Cl.
*F16H 55/56* (2006.01)
*F16G 5/16* (2006.01)

(52) U.S. Cl. ............... 474/8; 474/14; 156/139
(58) Field of Classification Search ............... 384/8, 384/12, 17, 23, 174, 177–178, 242, 245; 156/137–139; 180/219
See application file for complete search history.

(56) References Cited

U.S. PATENT DOCUMENTS

| | | | |
|---|---|---|---|
| 2,776,575 A * | 1/1957 | Michie | 474/46 |
| 2,892,354 A * | 6/1959 | Amonsen | 474/46 |
| 4,781,660 A * | 11/1988 | Amataka et al. | 474/174 |
| 4,790,799 A * | 12/1988 | Sadler | 474/242 |
| 4,947,533 A * | 8/1990 | Taniguchi et al. | 29/894 |
| 5,887,230 A * | 3/1999 | Sakamaki et al. | 399/167 |
| 6,254,503 B1 * | 7/2001 | Chiba et al. | 474/8 |
| 6,283,882 B1 * | 9/2001 | Nonaka et al. | 474/242 |
| 6,421,903 B2 * | 7/2002 | Brown | 29/428 |
| 6,435,725 B1 * | 8/2002 | Smith | 384/492 |
| 6,648,781 B1 * | 11/2003 | Fischer et al. | 474/8 |
| 6,715,379 B2 * | 4/2004 | Miguchi et al. | 74/745 |
| 2003/0127369 A1 * | 7/2003 | Robinson et al. | 209/214 |
| 2006/0017047 A1 * | 1/2006 | Calver | 254/411 |
| 2007/0004543 A1 * | 1/2007 | Ishida | 474/8 |
| 2007/0099734 A1 * | 5/2007 | Hansen et al. | 474/8 |

FOREIGN PATENT DOCUMENTS

| | | | |
|---|---|---|---|
| JP | 05060193 A | * | 3/1993 |
| JP | 2001227424 A | * | 8/2001 |
| JP | 2002-147553 | | 5/2002 |

\* cited by examiner

*Primary Examiner*—Marcus Charles
(74) *Attorney, Agent, or Firm*—Keating & Bennett, LLP

(57) ABSTRACT

Wear of a V-belt and wear of sheaves in a belt type continuously variable transmission is compatibly prevented. A V-belt wound around a primary sheave \ and a secondary sheave is formed with a resin block belt. A sheave surface of the primary sheave is plated with chrome. The secondary sheave is made of stainless steel and is not plated with chrome. The sheave surface hardness of the secondary sheave is lower than the sheave surface hardness of the primary sheave.

17 Claims, 15 Drawing Sheets

[FIG. 8]
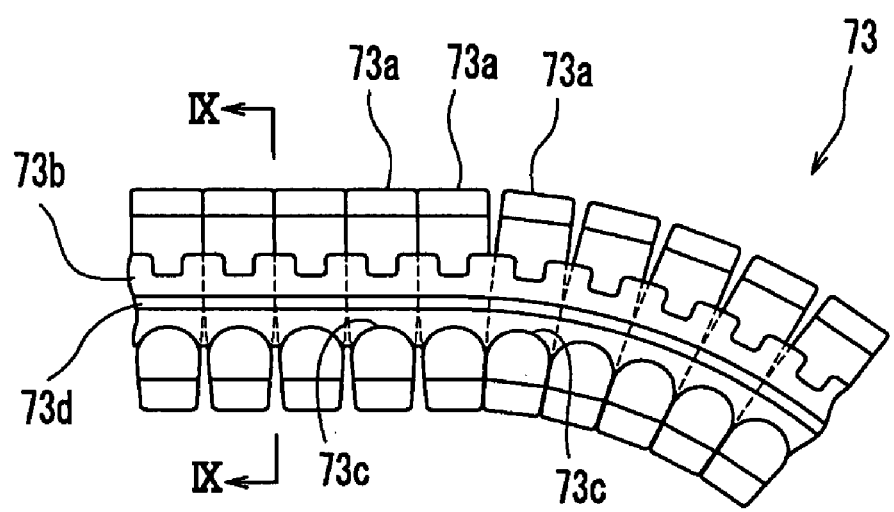

[FIG. 9]
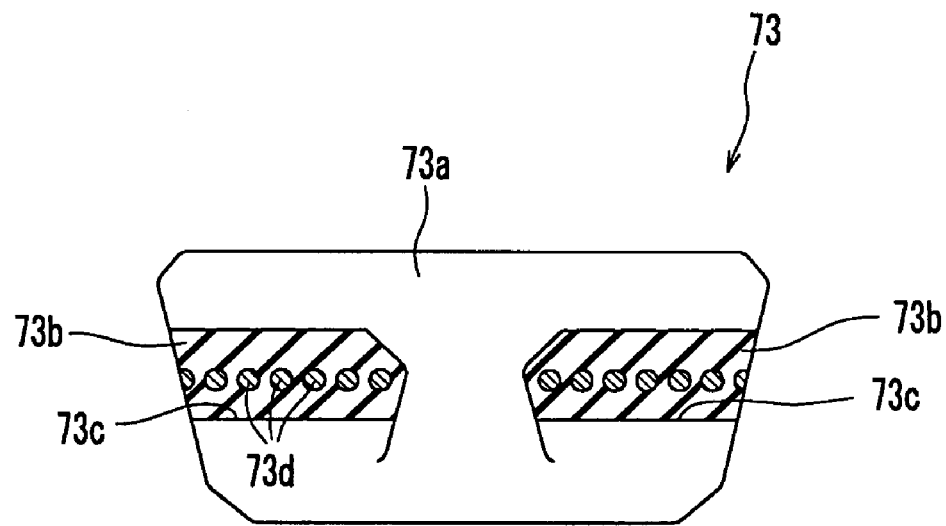

[FIG. 10]
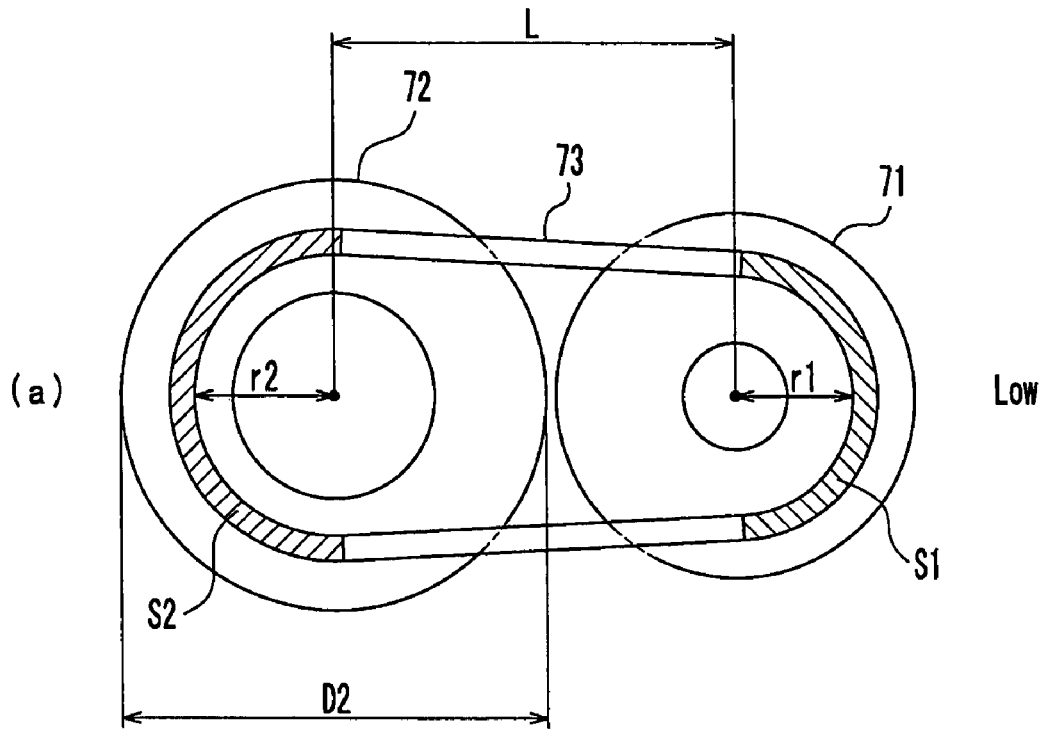
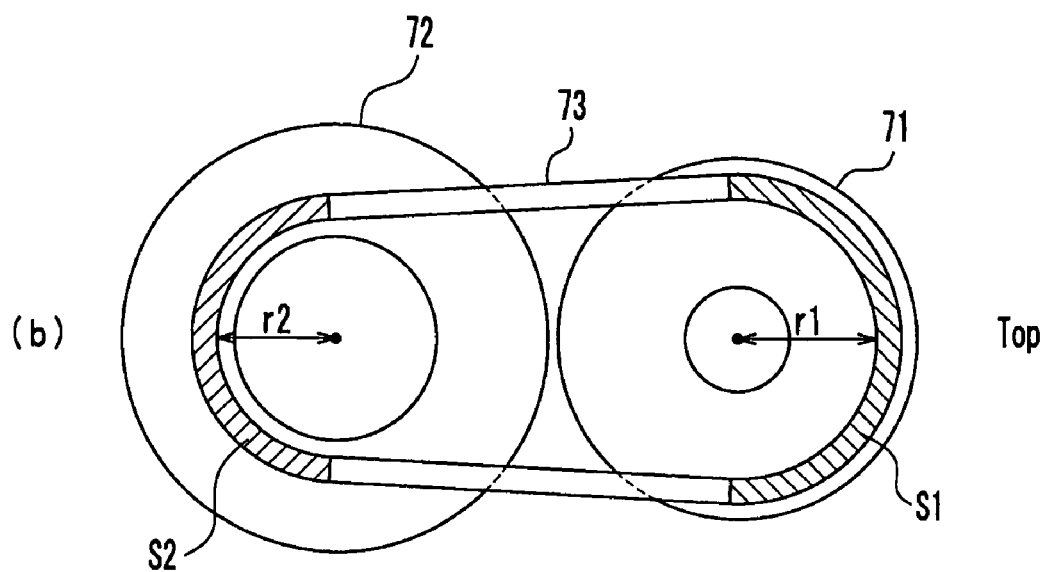

[FIG. 11]
(a)
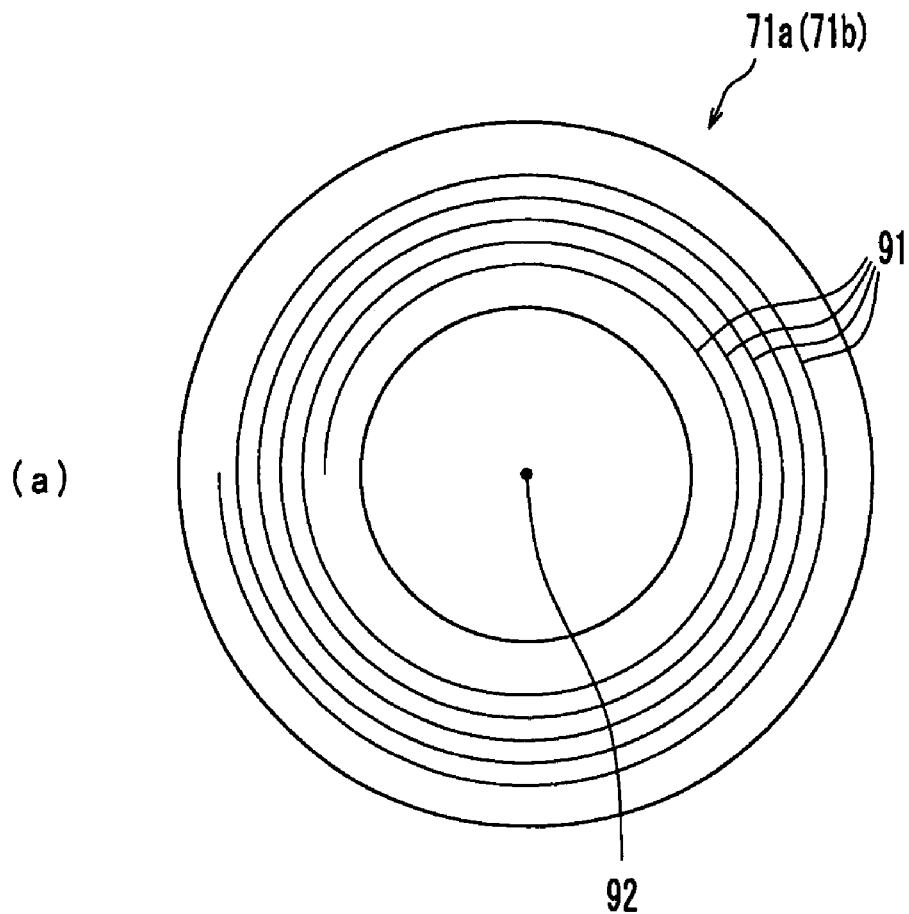
(b)
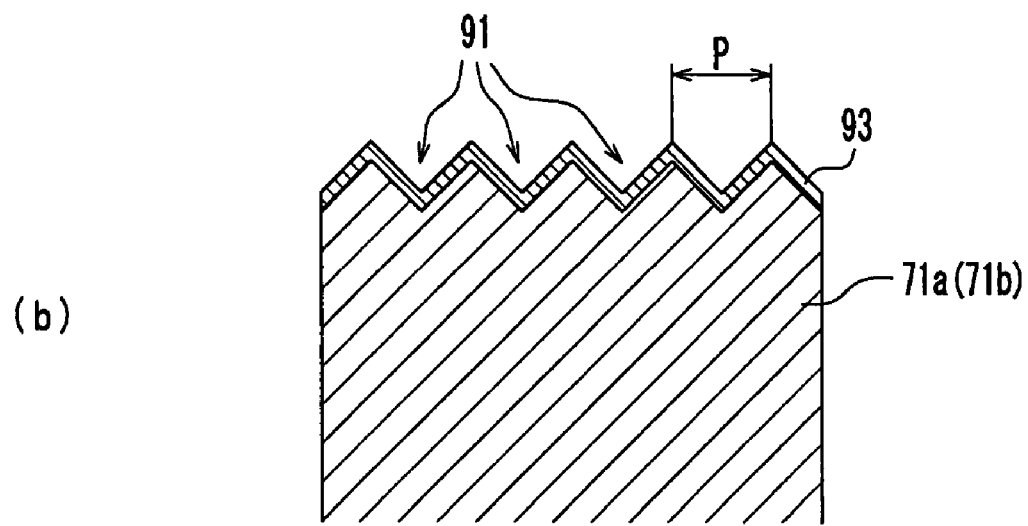

[FIG. 12]
(a)
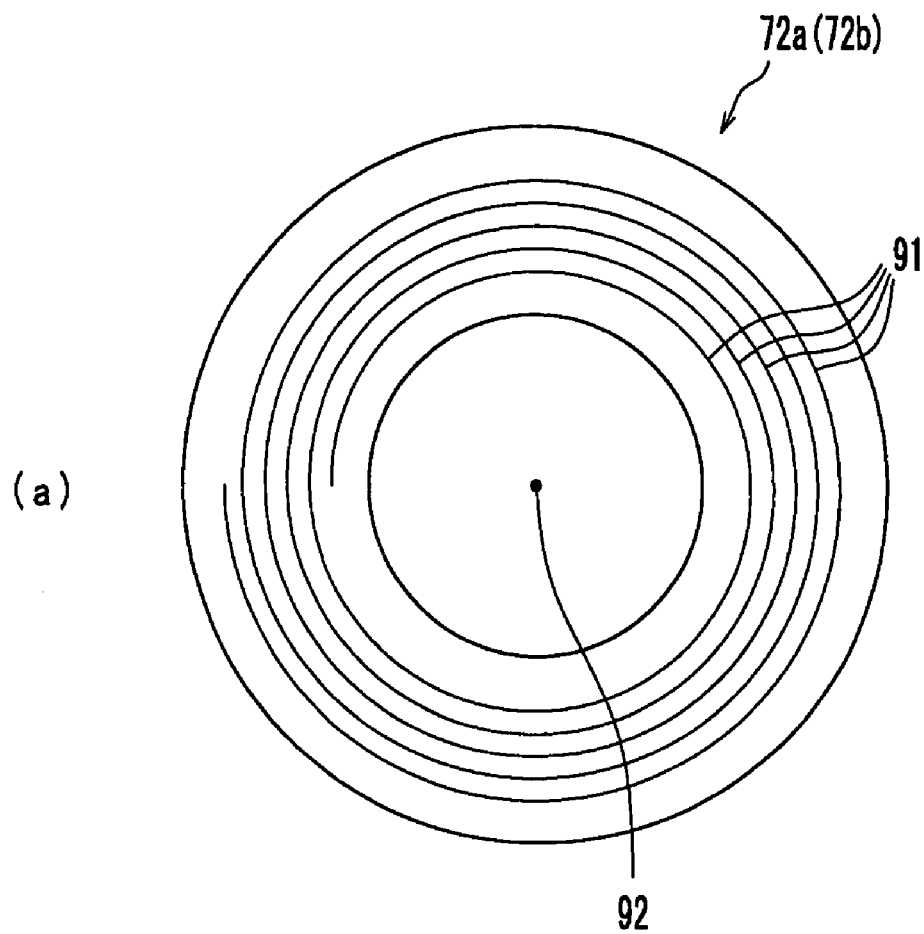
(b)
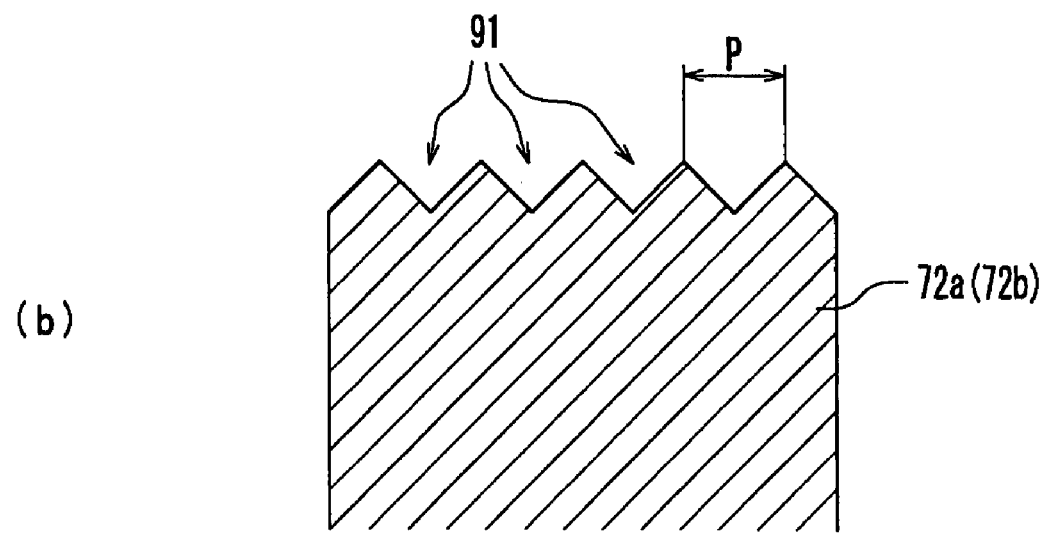

[FIG. 13]
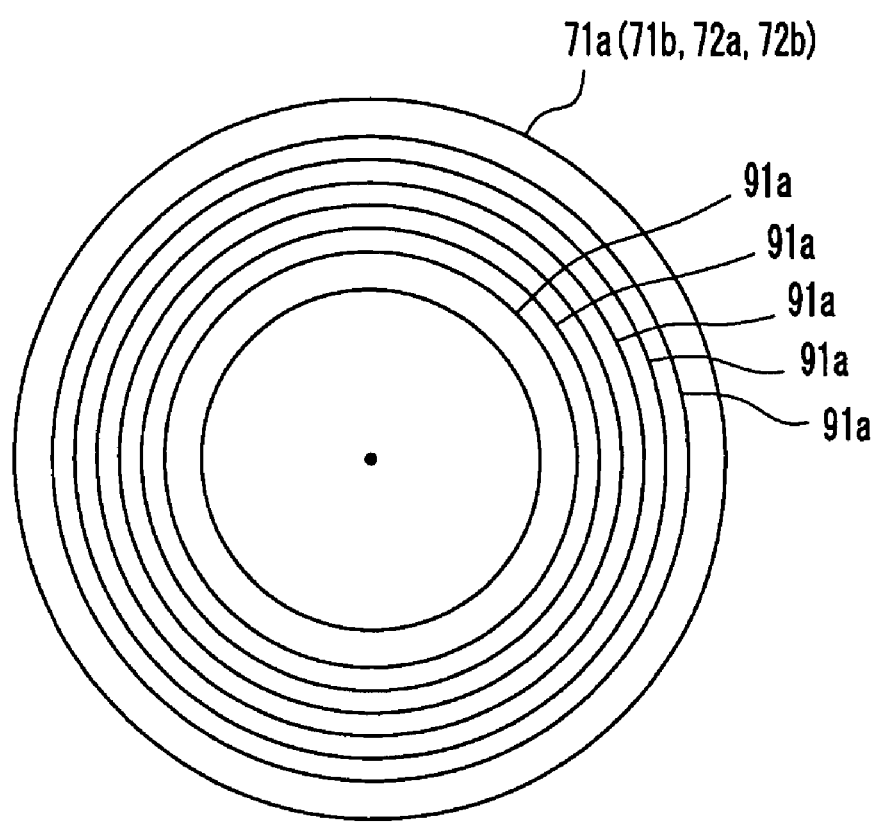

BELT-TYPE CONTINUOUSLY VARIABLE TRANSMISSION AND STRADDLE-TYPE VEHICLE

RELATED APPLICATIONS

This application claims the benefit of priority under 35 USC 119 of Japanese patent application nos. 2006-191132, filed on Jul. 12, 2006, which application is hereby incorporated by reference in its entirety.

BACKGROUND OF THE INVENTION

1. Field of the Invention

This invention relates to a belt type continuously variable transmission for a straddle type vehicle.

2. Description of Related Art

Straddle type vehicles having a belt type continuously variable transmission are known. The belt type continuously variable transmission has a primary sheave to which driving force from an engine is transmitted and a secondary sheave to which driving force is transmitted from the primary sheave via a V-belt. A speed reduction ratio varies in accordance with changes of a winding radius of the belt in the primary sheave and a winding radius of the V-belt in the secondary sheave.

If the V-belt is made of rubber, it is likely to wear and have reduced durability. Also, the V-belt may also deteriorate due to heat generation following deformation of the V-belt. Therefore, a resin block belt made of coupled multiple resin blocks has been proposed (see JP-A-2002-147553).

In a belt type continuously variable transmission having a resin block belt, the belt itself hardly wears. However another problem arises in that surfaces of the sheaves are likely to wear. Thus, JP-A-2002-147553 page 2, right column, lines 34-38) proposes plating surfaces of the primary and secondary sheaves with chrome.

The resin block belt has some extent of strength. However, it has been discovered that, if surfaces of the primary and secondary sheaves are plated with chrome, wear of the resin block belt increases. Thus, it is difficult according to the conventional art to compatibly prevent both wear of the V-belt and wear of the sheaves.

SUMMARY OF THE INVENTION

The present invention is made under these circumstances and compatibly prevents both wear of a V-belt and wear of sheaves.

The inventors made every effort to achieve this object and paid attention to a difference between contact pressures (sheave thrust/contact area) of sheave surfaces of the primary and secondary sheaves.

Considering the primary sheave first, as shown in FIG. 10(a), if engine speed is low (in other words, if a rotational speed of primary sheave 71 is low), the speed reduction ratio of the belt type continuously variable transmission becomes large and a winding radius r1 of V-belt 73 in primary sheave 71 becomes relatively small. Accordingly, a contact area S1 between primary sheave 71 and V-belt 73 also becomes relatively small. In addition, the driving force (sheave thrust) transmitted from primary sheave 71 to V-belt 73 is relatively small. Thus, the contact pressure of the sheave surface of primary sheave 71 is not so large.

On the other hand, if engine speed is high, the driving force transmitted from primary sheave 71 to V-belt 73 is relatively large. However, as shown in FIG. 10(b), the speed reduction ratio becomes small and winding radius r1 of V-belt 73 in primary sheave 71 becomes relatively large. Accordingly, contact area S1 between primary sheave 71 and V-belt 73 becomes relatively large. Therefore, even though engine speed is high, the contact pressure of the sheave surface of primary sheave 71 is not so large.

Considering the secondary sheave, as shown in FIG. 10(a), if engine speed is low, the speed reduction ratio becomes large and a winding radius r2 of V-belt 73 in secondary sheave 72 becomes relatively large. Accordingly, a contact area S2 between secondary sheave 72 and V-belt 73 also becomes relatively large. In addition, the driving force transmitted from V-belt 73 to secondary sheave 72 becomes relatively small. Thus, the contact pressure of the sheave surface of secondary sheave 72 becomes relatively small.

On the other hand, as shown in FIG. 10(b), if engine speed is high, the speed reduction ratio becomes small and winding radius r2 of V-belt 73 in secondary sheave 72 becomes relatively small. Accordingly, contact area S2 between secondary sheave 72 and V-belt 73 also becomes relatively small. In addition, the driving force transmitted from V-belt 73 to secondary sheave 72 becomes relatively large. Thus, if engine speed is high, the contact pressure of the sheave surface of secondary sheave 72 becomes relatively large.

That is, in the primary sheave, the contact pressure does not become so large even though the engine speed varies. To the contrary, in the secondary sheave, contact pressure becomes very large when engine speed is high (i.e., at the so-called top speed). From such analyses, the inventors realize that it is important to prevent wear of the belt in the secondary sheave at top speeds.

Also, the inventors realized the following differences between the primary and secondary sheaves. Because the primary sheave transmits the driving force from the engine to the V-belt, the primary sheave is likely to be affected by fluctuations of engine speed. To the contrary, the driving force from the engine is transmitted to the secondary sheave via the V-belt. Therefore, the secondary sheave is hardly affected by fluctuations of engine speed in comparison with the primary sheave.

From such analyses, the inventors realized that both wear of the belt and wear of the sheaves can be compatibly prevented by making the surface hardness of the secondary sheave less than the surface hardness of the primary sheave, and thus made the following invention.

A belt type continuously variable transmission according to the present invention includes a primary sheave to which driving force from an engine is transmitted and a secondary sheave. A V-belt wound around and contacting the primary and secondary sheaves is at least partially made of resin. The surface hardness of the secondary sheave is lower than the surface hardness of the primary sheave.

According to the invention, the surface hardness of the contact portion of the secondary sheave is relatively low. Even when the belt type continuously variable transmission is at top speeds and contact pressure becomes large, wear of the V-belt in the secondary sheave is prevented. Meanwhile, because the secondary sheave is hardly affected by the fluctuations, the secondary sheave does not remarkably wear in comparison with the primary sheave even though the surface hardness of the secondary sheave is relatively low. Accordingly, both wear of the V-belt and wear of the sheaves is compatibly prevented.

As thus discussed, according to the present invention, in the belt type continuously variable transmission, both wear of the V-belt and wear of the sheaves is compatibly prevented.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 8 is a side elevational view of a V-belt according to the invention.

FIG. 9 is a cross sectional view of the V-belt, taken along line IX-IX of FIG. 8.

FIG. 10(a) shows a winding condition of the V-belt at low speed; and FIG. 10(b) shows a winding condition of the V-belt at top speed.

FIG. 11(a) is a front elevation view of a sheave surface of a primary sheave according to a second embodiment of the invention; and FIG. 11(b) is a cross sectional view taken through the primary sheave of FIG. 11(a).

FIG. 12(a) is a front elevation view of a sheave surface of a secondary sheave according to a second embodiment of the invention; and FIG. 12(b) is a cross sectional view taken through the secondary sheave of FIG. 12(a).

FIG. 13 is a front elevational view of a sheave surface according to a variation of the invention.

DETAILED DESCRIPTION OF THE INVENTION

Embodiment 1

An embodiment of the invention is now described with reference to the accompanying drawings.

Figure 1:
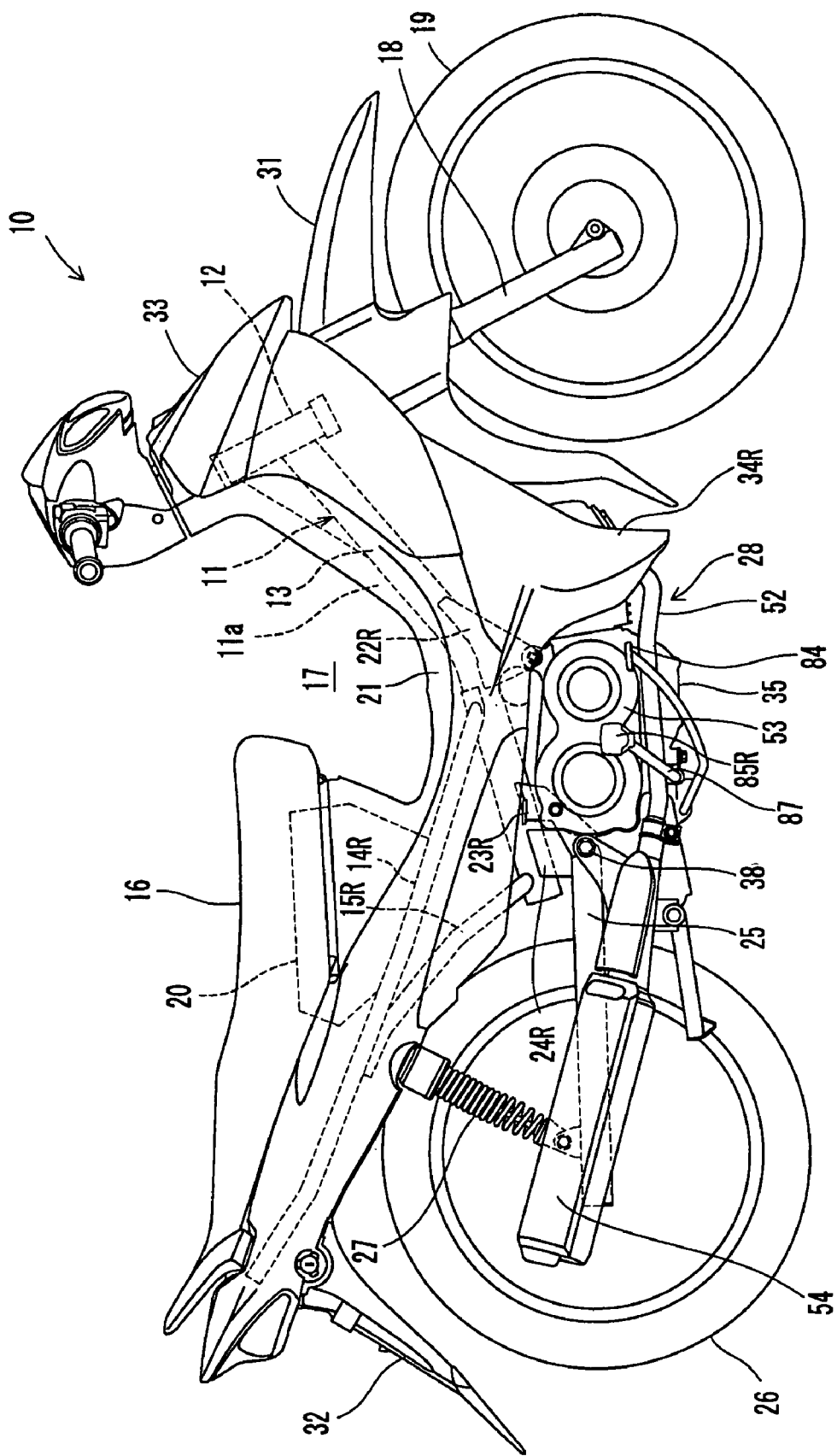
FIG. 1 is a side elevational view of a motorcycle according to an embodiment of the invention.

As shown in FIG. 1, a straddle type vehicle 10 according to this embodiment is a motorcycle. Straddle type vehicle 10 has a vehicle frame 11 and a seat 16. Straddle type vehicle 10 may be a moped type motorcycle, as illustrated in FIG. 1, a motorcycle- or scooter-type motorcycle, or a straddle type vehicle other than a motorcycle, such as an ATV.

In the following description, the fore to aft and lateral directions are from the perspective of a rider sitting on seat 16. Vehicle frame 11 includes a steering head pipe 12, a single main frame 13 extending obliquely downward and rearward from steering head pipe 12, left and right seat rails 14L (see FIG. 2) and 14R extending obliquely upward and rearward from a mid portion of main frame 13, and left and right seat pillar tubes 15L, 15R connected to a rear end portion of main frame 13 and mid portions of seat rails 14L, 14R.

A vehicle cover 21 covers top and lateral sides of vehicle frame 11. A space 17 recessed downward in a side view is defined above vehicle cover 21 and in front of seat 16. A center tunnel 11a through which main frame 13 extends is defined under vehicle cover 21.

Steering head pipe 12 supports a front wheel 19 via a front fork 18. Seat rails 14L, 14R support a fuel tank 20 and seat 16 thereabove. Seat 16 extends from an upper location of fuel tank 20 toward rear ends of seat rails 14L, 14R. Fuel tank 20 is disposed above top surfaces of front half portions of seat rails 14L, 14R and is covered with vehicle cover 21 and seat 16.

A first pair of left and right engine brackets 22L, 22R (see FIGS. 3 and 4) protrude downward from the mid portion of main frame 13. The rear end portion of main frame 13 has a second pair of left and right engine brackets 23L, 23R (see FIG. 5) and a pair of left and right rear arm brackets 24L, 24R (see FIGS. 3 and 4).

Rear arm brackets 24L, 24R protrude downward from the rear end portion of main frame 13 and have a pivot shaft 38. As shown in FIG. 1, pivot shaft 38 pivotally carries a front end portion of a rear arm 25. A rear end portion of rear arm 25 supports a rear wheel 26. Vehicle frame 11 suspends the rear half of rear arm 25 via cushion units 27.

Figure 5:
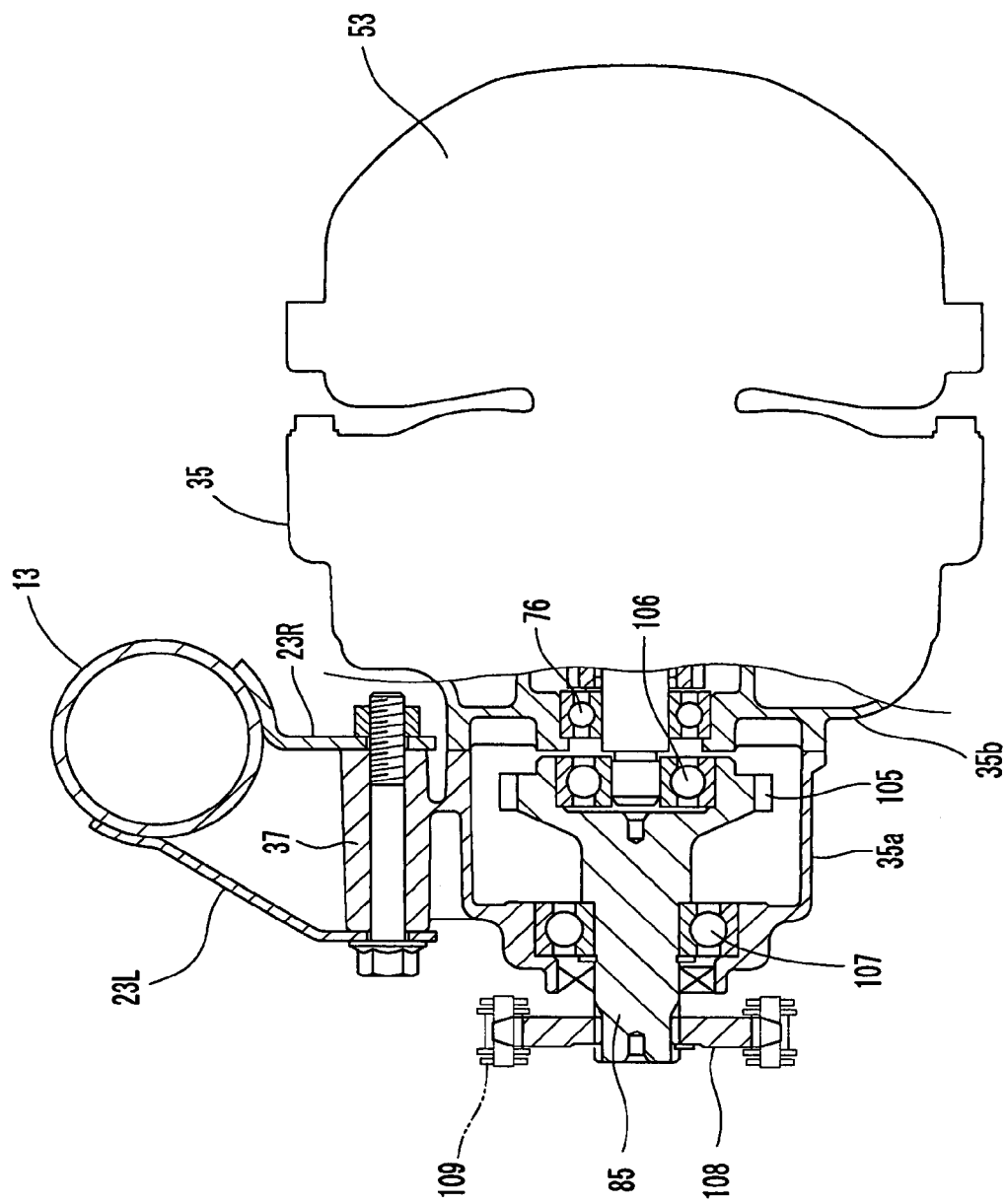
FIG. 5 is a cross sectional view, showing a mount condition of the engine unit.

As shown in FIG. 5, brackets 23L, 23R protrude downward from the rear end portion of main frame 13. Brackets 23L, 23R are spaced apart from each other and oppose each other in a width direction of the vehicle.

Figure 4:
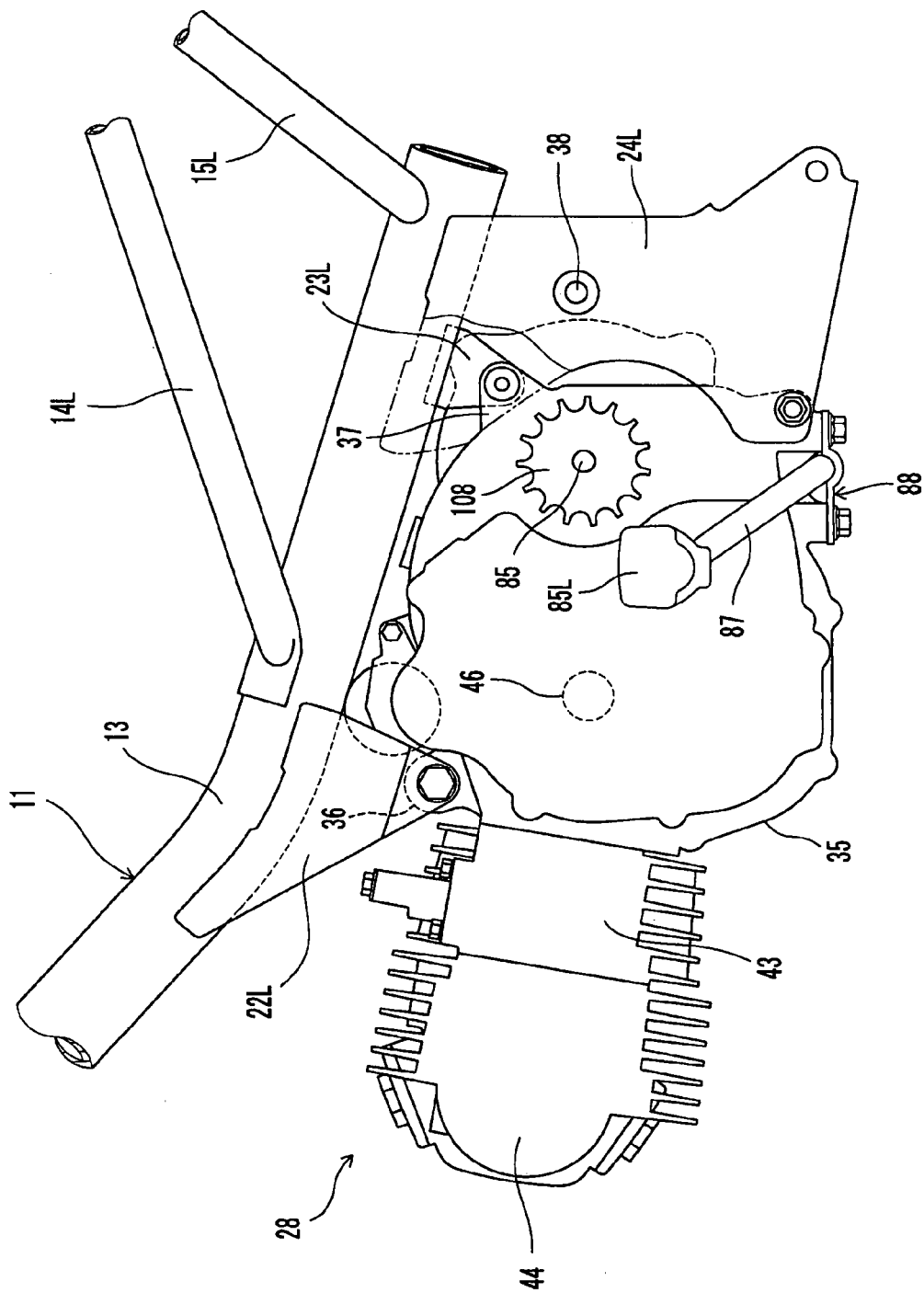
FIG. 4 is a left elevational view of the engine unit.

As shown in FIG. 1, vehicle frame 11 supports an engine unit 28 driving rear wheel 26. As shown in FIG. 4, engine unit 28 includes a crankcase 35, a cylinder 43 and a cylinder head 44. Crankcase 35 has first and second engine mount sections 36, 37. First engine mount sections 36 protrude upward from a top side of a front end portion of crankcase 35 and are supported by first engine brackets 22L, 22R. Second engine mount sections 37 protrude obliquely upward and rearward from a top side of a rear end portion of crankcase 35 and are supported by brackets 23L, 23R (see FIG. 5 also). Crankcase 35 thus depends from main frame 13.

Figure 6:
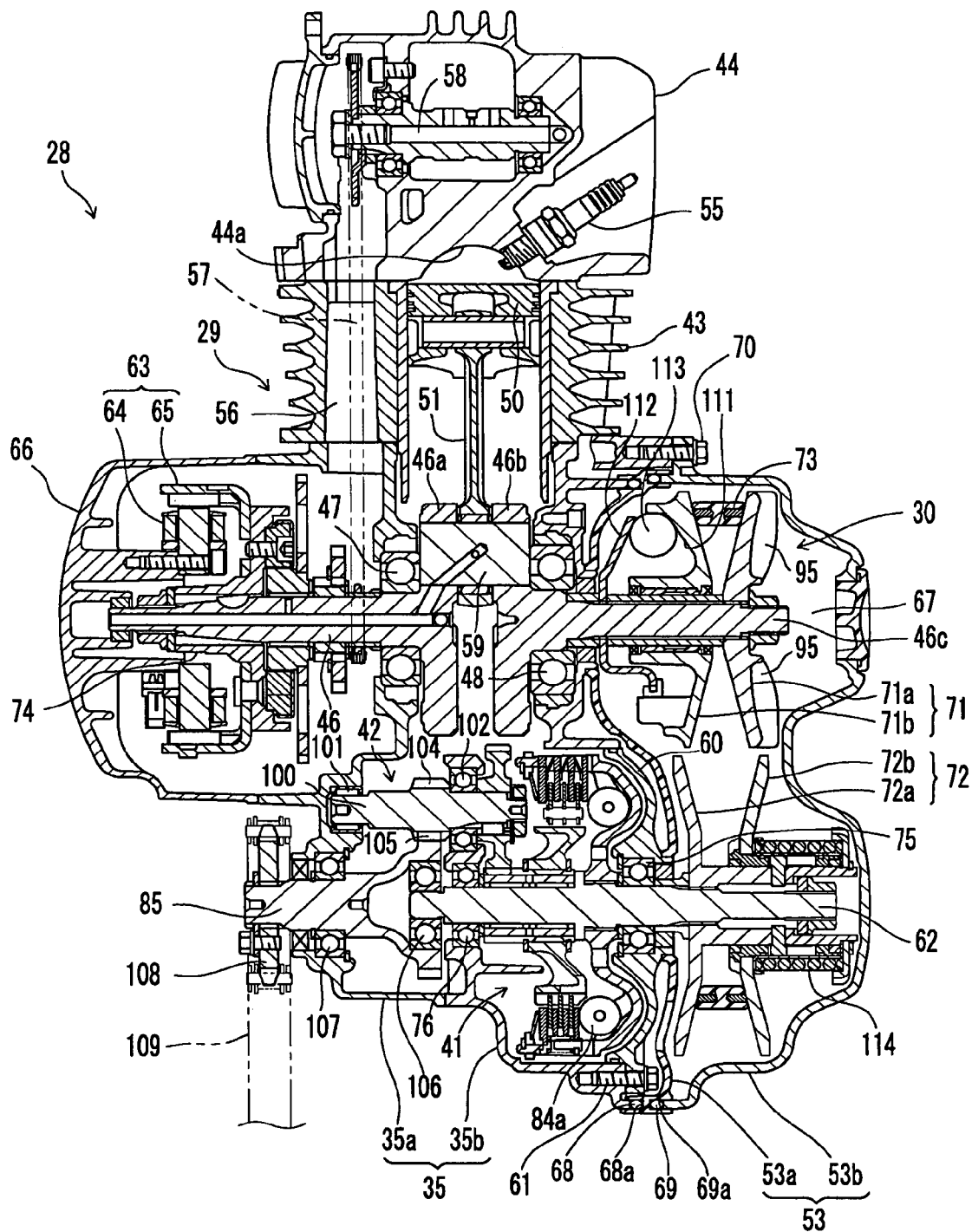
FIG. 6 is a cross sectional view showing an internal structure of the engine unit.

Engine unit 28 includes an engine 29 and a belt type continuously variable transmission (CVT) 30 (FIG. 6). Although not limited to this type, engine 29 in this embodiment is a four-stroke, single cylinder engine.

As shown in FIG. 1, a front fender 31 covers top and rear sides of front wheel 19, and a rear fender 32 covers a portion of rear wheel 28 between top and rear sides thereof. A front cowling 33 and lateral leg shields 34L, 34R (see FIG. 2) are also provided in addition to vehicle cover 21.

Figure 2:
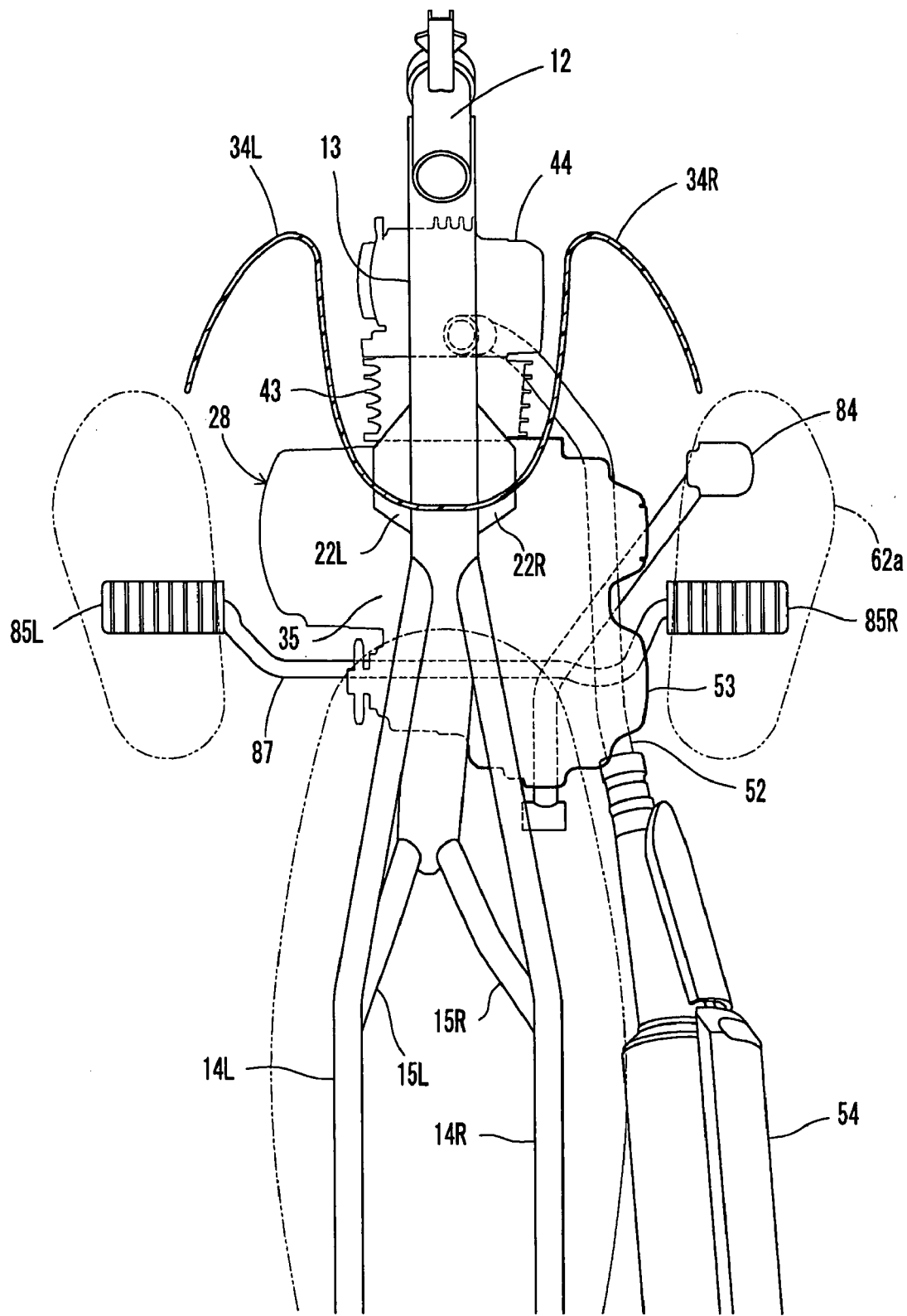
FIG. 2 is a partial top plan view of the motorcycle, showing relationships among positions of a vehicle frame, a leg shield, an engine unit and so forth.

As shown in FIG. 2, footrests 85L, 85R made of rubber or the like are disposed on left and right sides of engine unit 28. Crankcase 35 supports footrests 85L, 85R via a coupling bar 87 made of metal and an attaching plate 88 (see FIGS. 3 and 4) fixed to coupling bar 87.

As shown in FIGS. 1 and 2, a brake pedal 84 is disposed in front of footrest 85R on the right side. Brake pedal 84 extends below a transmission case 53 and projects obliquely forward on the right side. Brake pedal 84 also extends obliquely upward forwardly on the right side of transmission case 53. As shown in FIG. 2, when motorcycle 10 runs, the right foot 62a of the rider is positioned next to transmission case 53 in the width direction of the vehicle.

Next, an internal structure of engine unit 28 is described. As shown in FIG. 6, engine unit 28 includes engine 29, CVT 30, a centrifugal clutch 41 and a reduction gear mechanism 42.

Engine 29 includes crankcase 35, cylinder 43 coupled with crankcase 35 and cylinder head 44 coupled with cylinder 43. Crankcase 35 is comprised of two divided case blocks, i.e., a first case block 35a positioned on the left side and a second case block 35b positioned on the right side. First case block 35a and second case block 35b oppose each other in the width direction of the vehicle.

A crankshaft 46 is contained in, crankcase 35 and extends in the width direction of the vehicle to be disposed horizontally. Crankshaft 46 is journaled by first case block 35a via a bearing 47 and second case block 35b via a bearing 48.

A piston 50 is slidably disposed within cylinder 43. One end of a connecting rod 51 is coupled with piston 50. A crank pin 59 is disposed between a left side crank arm 46a and a right side crank arm 46b. The other end of connecting rod 51 is coupled with crank pin 59.

Figure 3:
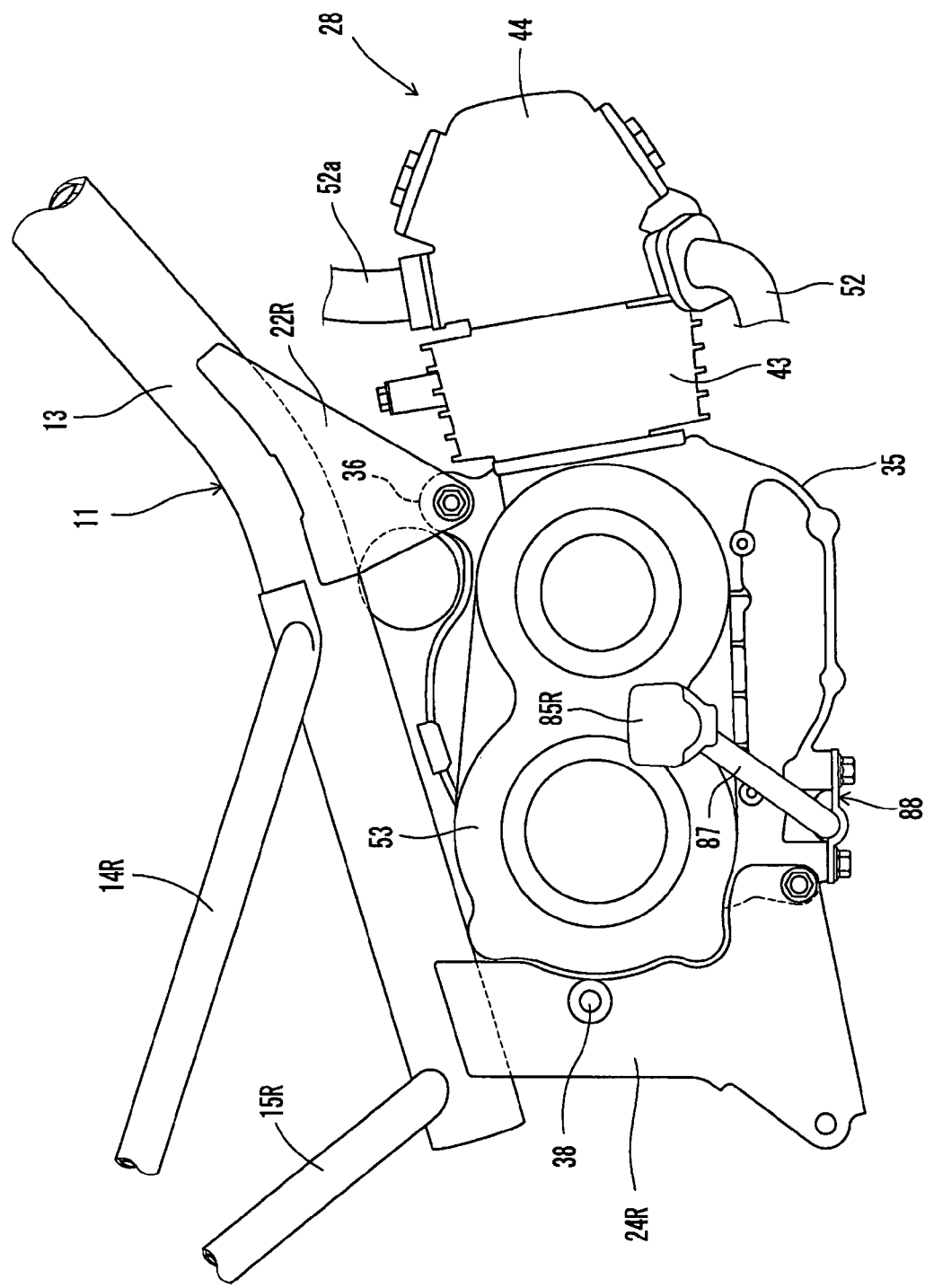
FIG. 3 is a right elevational view of the engine unit.

A recessed portion 44a and intake ports (not shown) and exhaust ports (not shown) both communicating with recessed portion 44a are defined in cylinder head 44. An ignition plug 55 is inserted into recessed portion 44a of cylinder head 44. As shown in FIG. 3, intake pipes 52a are connected to the intake ports, while exhaust pipes 52 are connected to the exhaust ports. As shown in FIGS. 1 and 2, exhaust pipes 52 extend from cylinder head 44 rearward and obliquely downward on the right side and further extend rearward below transmission case 53. Exhaust pipes 52 are then connected to a muffler placed on the right side of rear wheel 26.

As shown in FIG. 6, a cam chain chamber 56 is defined inside the left side of cylinder 43 to connect the inside of crankcase 35 and the inside of cylinder head 44. A timing chain 57 disposed in cam chain chamber 56 is wound around crankshaft 46 and camshaft 58. Camshaft 58 rotates with the rotation of crankshaft 46 to move the intake and exhaust valves between open and closed positions.

A generator case 66 containing a generator 63 is detachably mounted to a left side of a front half of first case block 35a. Transmission case 53 containing CVT 30 is mounted to a right side of second case block 35b.

An opening is defined in a right side surface of a rear half of second case block 35b. A clutch cover 60 closes the opening and is detachably fixed to second case block 35b by bolts 61.

Transmission case 53 is formed independently from crankcase 35. Transmission case 53 includes an inner case 53a covering an inner (left) side of CVT 30 in the width direction of the vehicle and an outer case 53b covering an outer (right) side of CVT 30 in the width direction. Inner case 53a is attached to a right surface of crankcase 35, while outer case 53b is attached to a right surface of inner case 53a. A belt chamber 67 is defined inside of inner case 53a and outer case 53b to contain CVT 30 therein.

As shown in FIG. 6, a right end portion of crankshaft 46 extends to belt chamber 67 through second case block 35b and inner case 53a. A primary sheave 71 of CVT 30 is fitted onto the right end portion of crankshaft 46. Primary sheave 71 thus rotates with the rotation of crankshaft 46. A right portion of crankshaft 46 (strictly, a portion positioned on the right side of bearing 48) forms a primary sheave shaft 46c.

The left end portion of crankshaft 46 extends into generator case 66 through first case block 35a. Generator 63 is mounted to the left end portion of crankshaft 46. Generator 63 includes a stator 64 and a rotor opposing stator 64. Rotor 65 is fixed to a sleeve 74 rotating together with crankshaft 46. Stator 64 is fixed to generator case 66.

Figure 7:
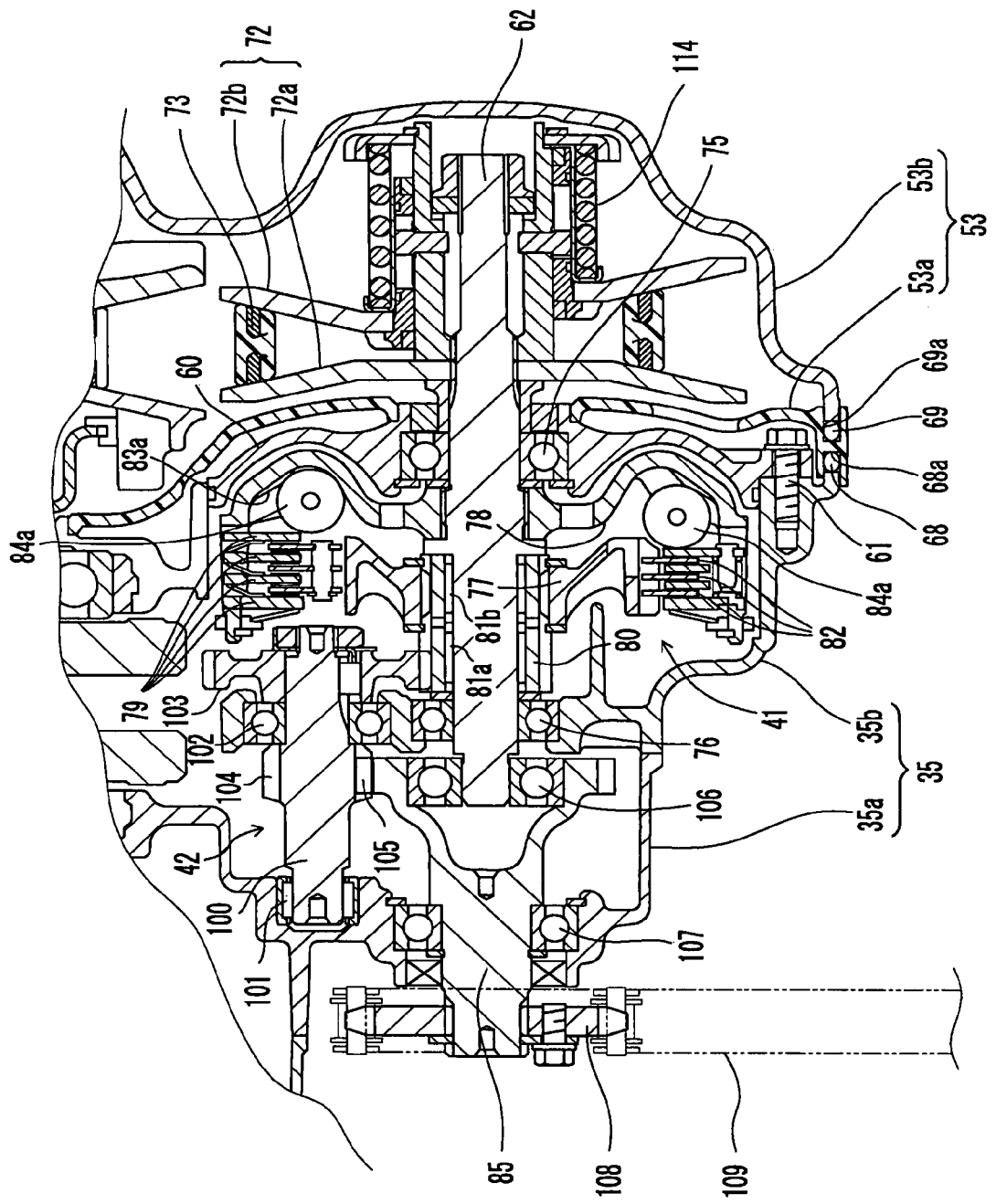
FIG. 7 is a cross sectional view, showing a part of the internal structure of the engine unit.

A secondary sheave shaft 62 is disposed in the rear half of crankcase 35 to extend parallel to crankshaft 46. As shown in FIG. 7, clutch cover 60 supports the central portion of secondary sheave shaft 62 via a bearing 75. The left end portion of second case block 35b supports a left portion of secondary sheave shaft 62 via a bearing 76.

A right end portion of secondary sheave shaft 62 extends to belt chamber 67 through second case block 35b and clutch cover 60. A secondary sheave 72 of CVT 30 is coupled with the right end portion of secondary sheave shaft 62.

As shown in FIG. 6, CVT 30 includes primary sheave 71, secondary sheave 72 and V-belt 73 wound around primary sheave 71 and secondary sheave 72. Primary sheave 71 is mounted to the right portion of crankshaft 46. Secondary sheave 72 is coupled with the right portion of secondary sheave shaft 62.

Primary sheave 71 includes a fixed sheave half 71a positioned outside in the width direction of the vehicle, and a movable sheave half 71b positioned inside in the width direction of the vehicle and opposing fixed sheave half 71a. Fixed sheave half 71a is fixed to the right end portion of primary sheave shaft 46c and rotates together with primary sheave shaft 46c. Movable sheave half 71b is placed on the left side of fixed sheave half 71a and is slidably mounted to primary sheave shaft 46c. Movable sheave half 71b thus rotates together with primary sheave shaft 46c and is also slidable in the axial direction of primary sheave shaft 46c. A belt groove is formed between fixed sheave half 71a and movable sheave half 71b.

Cooling fans 95 are formed on an outer surface (right side surface in FIG. 6) of fixed sheave half 71a. A cam surface 111 is formed on the left portion of movable sheave half 71b. A cam plate 112 is disposed on the left side of cam surface 111. A roller weight 113 is placed between cam surface 111 of movable sheave 71b and cam plate 112.

Secondary sheave 72 includes a fixed sheave half 72a positioned inside in the width direction of the vehicle, and a movable sheave half 72b positioned outside in the width direction of the vehicle and opposing fixed sheave half 72a. Movable sheave half 72b is mounted to the right end portion of secondary sheave shaft 62. Movable sheave half 72b is rotatable together with secondary sheave shaft 62 and is slidable on secondary sheave shaft 62 in the axial direction thereof. A compression coil spring 114 is disposed at the right end of secondary sheave shaft 62. Movable sheave half 72b receives the leftward urging force of compression coil spring 114. A shaft core portion of fixed sheave half 72a is a cylindrical slide collar that is fitted on secondary sheave shaft 62 by spline connection.

A speed reduction ratio of CVT 30 is decided in accordance with relationships between a magnitude of the force with which roller weight 113 pushes movable sheave half 71b rightward and a magnitude of the force with which compression coil spring 114 pushes movable sheave half 72b of secondary sheave 72 leftward.

That is, upon increase of the rotational speed of primary sheave shaft 46c, roller weight 113 receives the centrifugal force and moves outward in the radial direction to push movable sheave half 71b rightward. Then, movable sheave half 71b moves rightward and the belt winding radius in primary sheave 71 becomes larger. Following this operation, the belt winding radius in secondary sheave 72 becomes smaller. Movable sheave half 72b of secondary sheave 72 moves rightward against the urging force of compression coil spring 114. As a result, the winding radius of V-belt 73 in primary sheave 71 becomes larger, while the winding radius in secondary sheave 72 becomes smaller. The speed reduction ratio becomes smaller, accordingly.

In the meantime, upon decrease of the rotational speed of primary sheave shaft 46c, roller weight 113 moves inward in the radial direction along cam surface 111 of movable sheave half 71b and cam plate 112 because the centrifugal force of roller weight 113 becomes smaller. Therefore, the force with which roller weight 113 pushes movable sheave half 71b rightward becomes smaller. Then, the urging force of compression coil spring 114 becomes larger relative to the above force. Movable sheave half 72b of secondary sheave 72 moves leftward. In response to this movement, movable sheave half 71b of primary sheave 71 also moves leftward. As a result, the belt winding radius in primary sheave 71 becomes smaller, while the belt winding radius in secondary sheave 72 becomes larger. The speed reduction ratio becomes larger, accordingly.

Fixed sheave half 71a and movable sheave half 71b of primary sheave 71 are made of aluminum or an aluminum alloy. Sheave surfaces (surfaces contacting with V-belt 73) of fixed sheave half 71a and movable sheave half 71b of primary sheave 71 are plated with chrome. Consequently, the sheave surface hardness of fixed sheave half 71a and movable sheave half 71b reaches approximately 1,000 Hv. However, the material for plating the sheave surfaces is not limited to chrome and may be other materials sufficient to enhance wear resistance.

Fixed sheave half 72a and movable sheave body 72b of secondary sheave 72 are made of stainless steel (SUS304). The sheave surfaces of fixed sheave half 72a and movable sheave body 72b of secondary sheave 72 are not plated with chrome. Consequently, the sheave surface hardness values of fixed sheave half 72a and movable sheave half 72b reach approximately 400 Hv.

A seal groove 68a is formed along a periphery of inner case 53a on the left side thereof. A periphery of second case block 35b on the right side thereof is inserted into seal groove 68a. An O-ring 68 is interposed between inner case 53a and second case block 35b in seal groove 68a. Another seal groove 69a is formed along the periphery of inner case 53a on the right side thereof. A periphery of outer case 53b is inserted into seal groove 69a. Another O-ring 69 is interposed between inner case 53a and outer case 53b in seal groove 69a. Outer case 53b and second case block 35b are coupled with each other by bolts 70 under a condition that inner case 53a is interposed between outer case 53b and second case block 35b.

As shown in FIG. 7, centrifugal clutch 41 is mounted to the left portion of secondary sheave shaft 62. Centrifugal clutch 41 is a wet type multiple disk clutch and includes a generally cylindrical clutch housing 78 and a clutch boss 77. Clutch housing 78 is fitted onto secondary sheave shaft 62 by spline connection and rotates in unison with secondary sheave shaft 62. A plurality of circular clutch disks 79 are attached to clutch housing 78. Clutch disks 79 are spaced apart from each other in the axial direction of secondary sheave shaft 62.

A cylindrical gear 80 is rotatably fitted on and around the left portion of secondary sheave shaft 62 via two bearings 81a, 81b. Clutch boss 77 is positioned inside relative to clutch disks 79 in the radial direction and is positioned outside relative to gear 80 in the radial direction. Clutch boss 77 meshes with gear 80. Gear 80 thus rotates together with clutch boss 77. A plurality of circular friction disks 82 are attached to clutch boss 77 externally in the radial direction. Friction disks 82 are spaced apart from each other in the axial direction of secondary sheave shaft 62. Respective friction disks 82 are interposed between neighboring clutch disks 79, 79.

A plurality of cam surfaces 83a are formed on the left side of clutch housing 78. Roller weights 84a are disposed between cam surfaces 83a and clutch disk 79 placed at the right-most position and opposing cam surfaces 83a.

Centrifugal clutch 41 is automatically switched between a clutch-in condition (connected condition) and a clutch-out condition (disconnected condition) in accordance with magnitudes of the centrifugal force affected to roller weights 84a.

That is, when a rotational speed of clutch housing 78 exceeds a preset speed, the centrifugal force moves roller weights 84a outward in the radial direction. Roller weights 84a thus push clutch disks 79 leftward. As a result, clutch disks 79 and friction disks 82 compressively contact with each other. Centrifugal clutch 41 thus is in the clutch-in condition in which the driving force of secondary sheave shaft 62 is transmitted through gear 80 and reduction gear mechanism 42 to output shaft 85.

On the other hand, when the rotational speed of clutch housing 78 becomes lower than the preset speed, the centrifugal force exerted on roller weights 84a becomes smaller. Roller weights 84a thus move inward in the radial direction. As a result, clutch disks 79 and friction disks 82 are released from the state of compressive contact. Centrifugal clutch 41 thus is brought in the clutch-out condition in which driving force of secondary sheave shaft 62 is not transmitted through gear 80 and reduction gear mechanism 42. In FIG. 7, the front (upper side in FIG. 7) portion of centrifugal clutch 41 represents the clutch-out condition, while the rear (lower side in FIG. 7) portion thereof represents the clutch-in condition.

Reduction gear mechanism 42 is interposed between centrifugal clutch 41 and an output shaft 85. Reduction gear mechanism 42 has a shift shaft 100 extending parallel to secondary sheave shaft 62 and output shaft 85. Shift shaft 100 is journaled for rotation by first case block 35a via a bearing 101 and is also journaled for rotation by second case block 35b via a bearing 102. A first shift gear 103 meshing with gear 80 is placed at a right end portion of shift shaft 100.

A second shift gear 104 having a diameter smaller than a diameter of first shift gear 103 is placed at a central portion of shift shaft 100. A third shift gear 105 meshing with second shift gear 104 is externally and circumferentially formed at a right end portion of output shaft 85. The left end portion of secondary sheave shaft 62 supports an internal circumferential portion of the right end portion of output shaft 85 via a bearing 106. Accordingly, secondary sheave shaft 62 journals output shaft 85 for rotation via bearing 106. A left end portion of first case block 35a journals a central portion of output shaft 85 for rotation via a bearing 107.

In this structure, clutch boss 77 and output shaft 85 are coupled with each other through gear 80, first shift gear 103, shift shaft 100, second shift gear 104 and third shift gear 105. Output shaft 85 thus rotates with rotation of clutch boss 77.

A left end portion of output shaft 85 extends through first case block 35a and projects outside of crankcase 35. A drive sprocket 108 is fixed to the left end portion of output shaft 85. A chain 109 is engaged with drive sprocket 108 to transmit driving force from output shaft 85 to rear wheel 26. The mechanism for transmitting driving force to rear wheel 26 is not limited to chain 109. Other components, such as a transmitting belt, a gear train of plural gears assembled with each other and a drive shaft may be used to transmit driving force from output shaft 85 to rear wheel 26.

A structure of V-belt 73 is now described. As shown in FIGS. 8 and 9, V-belt 73 includes a plurality of resin blocks 73a aligned in one direction and a pair of coupling bodies 73b for coupling resin blocks 73a. As shown in FIG. 9, each resin block 73a is generally formed as a trapezoid to extend along the respective belt grooves of primary sheave 71 and secondary sheave 72. Recessed portions 73c recessed inward are formed at respective lateral sides of each resin block 73a.

Coupling bodies 73b are endlessly formed. As shown in FIG. 8, coupling bodies 73b extend in the alignment direction of resin blocks 73a and are inserted into recessed portions 73c of respective resin blocks 73a. Because coupling bodies 73b are inserted into recessed portions 73c of resin blocks 73a, blocks 73 are coupled with each other via the paired coupling bodies 73b. Each coupling body 73b is made of rubber. As shown in FIG. 9, a plurality of reinforcing core wires 73d are embedded in each coupling body 73b of rubber. In V-belt 73, the left and right lateral side surfaces of resin blocks 73a and coupling bodies 73b are contact surfaces in contact with the respective sheave surfaces of primary sheave 71 and secondary sheave 72.

The present invention encompasses any V-belt wherein at least a part of the contact portion thereof contacting the sheave surfaces is made of resin. That is, the present invention is not limited to V-belt 73 in which coupling bodies 73b couple resin blocks 73a with each other.

As thus described, according to CVT 30 of this embodiment, the sheave surface hardness of secondary sheave 72 is lower than the sheave surface hardness of primary sheave 71. Therefore, wear of V-belt 73 in secondary sheave 72 is avoided even at top speeds where the contact pressure of the sheave surfaces is high. Because secondary sheave 72 is hardly affected by fluctuations of the engine speed in comparison with primary sheave 71, secondary sheave 72 is unlikely to remarkably wear in comparison with primary sheave 71, even though the sheave surface hardness of secondary sheave 72 is relatively low. Accordingly, wear of V-belt 73 and wear of primary sheave 71 and secondary sheave 72 are compatibly prevented.

In this embodiment, the sheave body of primary sheave 71 (fixed sheave half 71a and movable sheave half 71b) is made of aluminum and the sheave surface of the sheave body is coated with chrome. Therefore, the surface hardness of the sheave surface is raised while the sheave body is lightened. Also, because aluminum has good cooling retaining properties, the cooling performance of primary sheave 71 is enhanced. Higher performance of CVT 30 is thus achieved. On the other hand, fixed sheave half 72a and movable sheave half 72b of secondary sheave 72 are made of stainless steel and the sheave surfaces thereof are not plated with chrome. Accordingly, CVT 30 can be inexpensively produced to the extent that no plating is necessary for secondary sheave 72. Further, the surface hardness of the sheave surface of primary sheave 71 is raised higher than the surface hardness of the sheave surface of secondary sheave 71 by the relatively simple method or plating process.

Additionally, stainless steel has superior wear resistance. Corrosion resistance of secondary sheave 72 is thus maintained without plating of the sheave surface of secondary sheave 72. Because rust hardly occurs, ambient air can cool secondary sheave 72 without requiring any particular measures.

Because secondary sheave 72 is made of stainless steel, the sheave surface hardness of secondary sheave 72 is approximately 400 Hv. However, the sheave surface hardness of secondary sheave 72 is only required to be equal to or higher than 100 Hv to prevent wear of the sheave surface, and thus is not limited to be about 400 Hv.

In CVT 30 according to this embodiment, a distance in which V-belt 73 moves in the radial direction of secondary sheave 72 while a condition under which the speed reduction ratio is the maximum value (top speed) varies to another condition under which the speed reduction ratio is the minimum value (low speed) is shorter than a distance in which V-belt 73 moves in the radial direction of primary sheave 72. Specifically, the distance of movement of V-belt 73 in the radial direction of the sheaves is represented by a difference between the belt winding radius at the top speed and the belt winding radius at the low speed. In this embodiment, the difference between the belt winding radius at the top and low speeds in primary sheave 71 is approximately 36.5 mm, while the difference between the belt winding radius at the top and low speeds in secondary sheave 72 is approximately 32.5 mm (<36.5 mm).

As thus discussed, the amount of the movement of V-belt 73 in the radial direction in secondary sheave 72 is shorter than that in primary sheave 71. Therefore, wear of secondary sheave 72 is prevented even though the sheave surface hardness of secondary sheave 72 is lower than the sheave surface hardness of primary sheave 71.

As shown in FIG. 10(a), in CVT 30 according to this embodiment, a distance between primary sheave 71 and secondary sheave 72 is short in comparison with sizes of primary sheave 71 and secondary sheave 72. Specifically, a distance L between the axis of primary sheave 71 and the axis of secondary sheave 72 is less than double the diameter D2 of secondary sheave 72. Also, both primary sheave 71 and secondary sheave 72 are disposed between the axis of front wheel 19 and rear wheel 26 (see FIG. 1). In this embodiment, therefore, a ratio of the part contacting with sheave surfaces of primary sheave 71 and secondary sheave 72 to the whole length of V-belt 73 is large. Accordingly, ingoing and outgoing times of V-belt 73 to and from the sheave grooves are frequent. CVT 30 thus intrinsically has a structure in which V-belt 73 is likely to wear. In this embodiment, however, wear of V-belt 73 is prevented as discussed above. Thus, no problem arises even though the distance between primary sheave 71 and secondary sheave 72 is short.

Embodiment 2

As shown in FIGS. 11 and 12, a CVT 30 according to Embodiment 2 has a structure in which a spiral groove is formed in the sheave surfaces of primary sheave 71 and secondary sheave 72 of Embodiment 1.

CVT 30 needs some frictional force between sheaves 71, 72 and V-belt 73 to properly transmit the driving force. In the meantime, however, because V-belt 73 travels between primary sheave 71 and secondary sheave 72, respective portions of V-belt 73, in local views, continuously go into the sheave grooves and go out therefrom. Some extent of slidability or "lubrication property" thus is necessary between V-belt 73 and sheaves 71, 72. This is because, unless the lubrication property is ensured, heat is generated by friction between V-belt 73 and sheaves 71, 72, and CVT 30 is likely to be excessively heated.

However, oil, water and the like are normally not allowed to enter CVT 30 (hereunder, referred to "under the dry circumstances"). Lubricating agents cannot be applied between V-belt 73 and sheaves 71, 72. Thus, it is conceivable that the lubrication property between sheaves 71, 72 and V-belt 73 is brought mainly by powder originating from V-belt 73 (wear powder). That is, it is conceivable that sheaves 71, 72 and V-belt 73 are slidable with each other while keeping some extent of the friction because the wear powder originating from V-belt 73 is retained on the sheave surfaces.

If, however, the sheave surfaces are smooth, proper retention of the wear powder on the contact portions with V-belt 73 is difficult, which makes proper keeping of the lubrication property between sheaves 71, 72 and V-belt 73 difficult. Thus, the sheave surfaces preferably have irregularities for retaining wear powder (at least the portions in contact with V-belt 73).

As shown in FIGS. 11(a) and (b), in this embodiment, a groove 91 is formed on the sheave surfaces of fixed sheave half 71a and movable sheave half 71b of primary sheave 71 by turning. As shown in FIGS. 12(a) and (b), another groove 91 is formed on the sheave surfaces of fixed sheave half 72a and movable sheave half 72b of secondary sheave 72 by turning.

Grooves 91 are spirally formed around axes 92 of sheave halves 71a, 71b, 72a, 72b. As shown in FIG. 11(b) and FIG. 12(b), because of having grooves 91, cross sections of sheave halves 71a, 71b, 72a, 72b in the radial direction are unevenly formed. Reference numeral 93 of FIG. 11(b) indicates a chrome plating layer.

Pitch P of groove 91 may be, for example, 0.10 mm. The surface roughness of each sheave surface may be, for example, equal to or less than 0.5 z.

The grooves on the sheave surfaces are not limited to spiral grooves 91. For example, as shown in FIG. 13, a plurality of coaxial circular grooves 91a may be formed on each sheave surface. In view of properly retaining the wear powder, the grooves of the sheave surfaces should be formed in such a manner that the cross sections of sheave halves 71a, 71b, 72a, 72b in the radial direction are uneven. However, as long as wear powder can be properly retained, configurations of the grooves on the sheave surfaces are not specifically limited.

Figure 14:
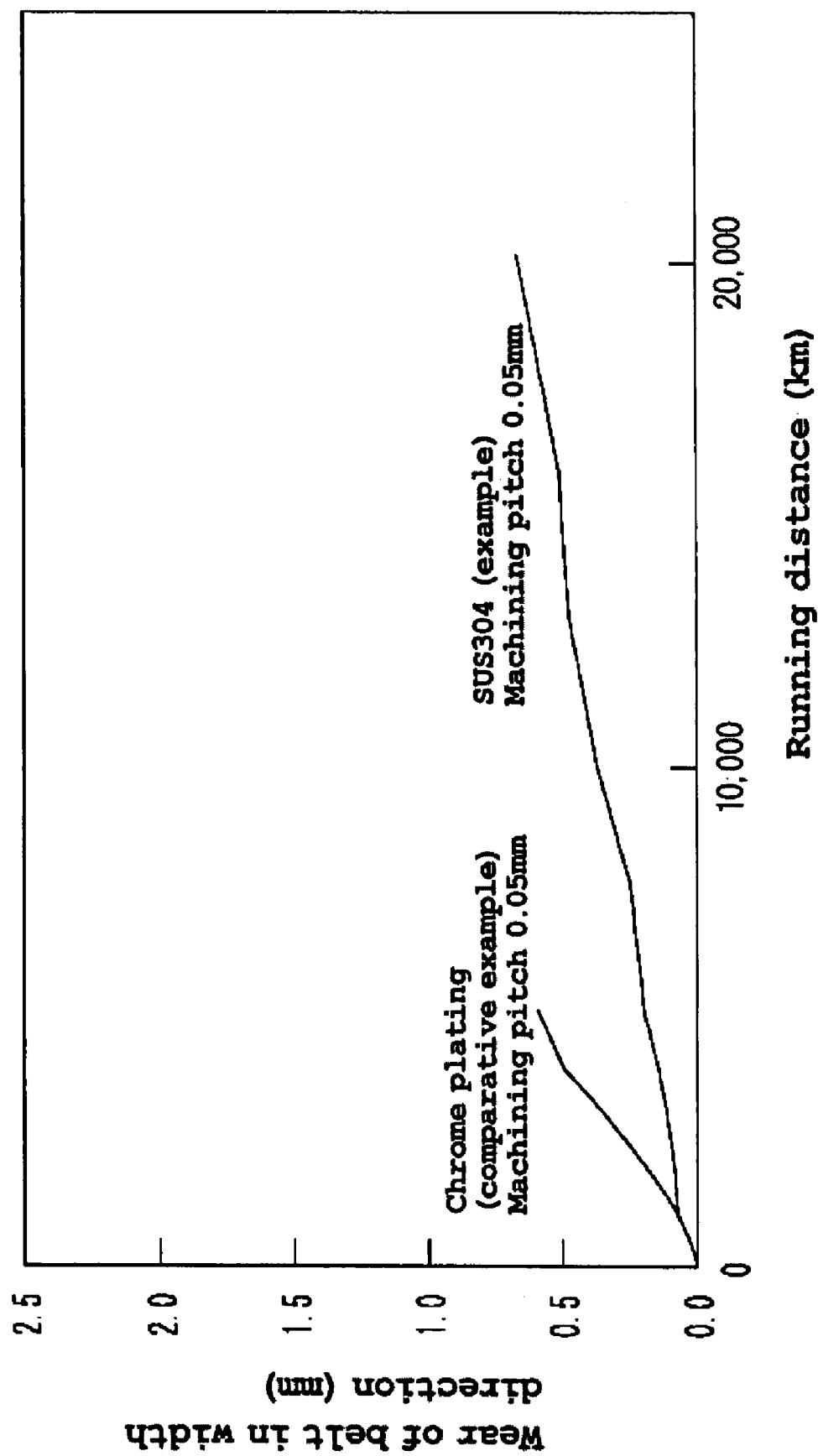
FIG. 14 is a graph of test data according to the invention.
Figure 15:
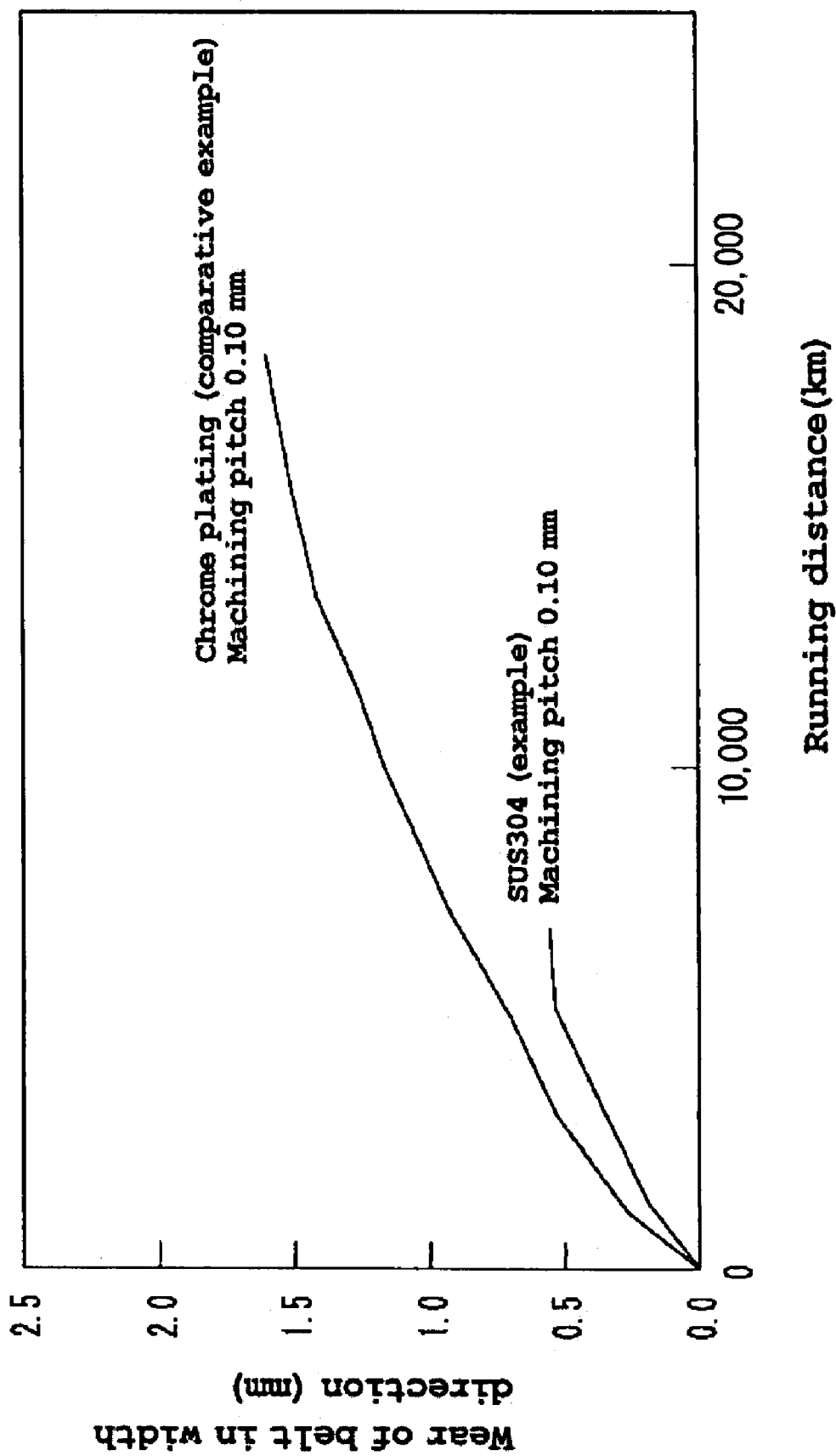
FIG. 15 is another graph of other test data according to the invention.

FIGS. 14 and 15 show test results indicating belt wear differences based upon sheave surface hardness of secondary sheave 72. In FIGS. 14 and 15, the horizontal axes indicate the running distance of a motorcycle, while the vertical axes indicate the wear of V-belt 73 in its width direction. In both tests shown in FIGS. 14 and 15, the sheave surface of primary sheave 71 is plated with chrome. In the embodiments, secondary sheave 72 is made of stainless steel, i.e., SUS304, and is not coated with any plating material. Therefore, the sheave surface hardness of secondary sheave 72 is lower than the sheave surface hardness of primary sheave 71. To the contrary, in the compared examples, the sheave surface of secondary sheave 72 is plated with chrome. Thus, the sheave surface hardness of secondary sheave 72 and the sheave surface hardness of first sheave 71 are equal.

In FIG. 14 the pitch P of the groove is 0.05 mm, while in FIG. 15 the pitch P is 0.10 mm. As seen from these figures, the wear of V-belt 73 in the embodiments is less than in the comparative examples.

According to this embodiment, because each of the sheave surfaces of primary sheave 71 and secondary sheave 72 has spiral groove 91, wear powder of V-belt 73 is properly retained on the sheave surfaces. Accordingly, a good lubrication property is ensured between sheaves 71, 72 and V-belt 73 while some extent of frictional force is kept therebetween. As a result, heat generation of V-belt 73 is prevented. In this point as well, wear of V-belt 73 and wear of sheaves 71, 72 are compatibly prevented.

Also, because wear of sheaves 71, 72 is prevented, the uneven configuration on each sheave surface deteriorates very little over time. Accordingly, the lubrication property of V-belt 73 can be maintained for a long period of time.

If the sheave surface of secondary sheave 72 is plated with chrome, the plated chrome of secondary sheave 72 whose contact pressure is high at top speed can wear away prior to primary sheave 71, and excessive amount of the wear powder can be produced from secondary sheave 72. In this embodiment, however, because secondary sheave 72 is not plated with chrome, the wear power produced from secondary sheave 72 does not cause any damage to primary sheave 71. Also, the wear powder of the plated chrome is only produced from primary sheave 71 whose contact pressure is low. Therefore, an amount of the wear powder produced from the whole sheaves is small.

In addition, according to this embodiment, grooves 91 are formed by turning the sheave surfaces of sheaves 71, 72, and are thus simply and inexpensively realized.

As thus described, the present invention is useful with belt type continuously variable transmissions and straddle type vehicles having the same.

The particular embodiments of the invention described in this document should be considered illustrative, rather than restrictive. Modification to the described embodiments may be made without departing from the spirit of the invention as defined by the following claims.

The invention claimed is:

1. A belt type continuously variable transmission comprising:
    a primary sheave to which a driving force from an engine is transmitted, the primary sheave including a fixed primary sheave half and a movable primary sheave half each made of the same material and having the same surface hardness;
    a secondary sheave, the secondary sheave including a fixed secondary sheave half and a movable secondary sheave half each made of the same material and having the same surface hardness; and
    a V-belt wound around and contacting the primary sheave and the secondary sheave, and being at least partially made of resin, wherein
    the surface hardness of the secondary sheave is lower than the surface hardness of the primary sheave.

2. The belt type continuously variable transmission according to claim 1, wherein the primary sheave is coated with a plating material having a hardness higher than a hardness of the primary sheave; and the secondary sheave is not coated with the plating material.

3. The belt type continuously variable transmission according to claim 2, wherein the plating material contains chrome.

4. The belt type continuously variable transmission according to claim 3, wherein the primary sheave is made of aluminum or an aluminum alloy.

5. The belt type continuously variable transmission according to claim 2, wherein the primary sheave is made of aluminum or an aluminum alloy, and the secondary sheave is made of stainless steel.

6. The belt type continuously variable transmission according to claim 1, wherein the secondary sheave is made of stainless steel.

7. The belt type continuously variable transmission according to claim 1, wherein the surface hardness of the secondary sheave is at least 100 Hv.

8. The belt type continuously variable transmission according to claim 1, wherein a distance in which the V-belt moves in a radial direction of the secondary sheave while a condition under which a speed reduction ratio is the maximum value varies to another condition under which the speed reduction ratio is the minimum value is shorter than a distance in which the V-belt moves in a radial direction of the primary sheave.

9. The belt type continuously variable transmission according to claim 8, wherein the difference between a belt winding radius at top and low speeds in the primary sheave is approximately 36.5 mm, and the difference between a belt winding radius at top and low speeds in the secondary sheave is approximately 32.5 mm.

10. The belt type continuously variable transmission according to claim 1, wherein a distance between an axis of the primary sheave and an axis of the secondary sheave is less than double the diameter of the secondary sheave.

11. The belt type continuously variable transmission according to claim 1, wherein the secondary sheave is machined by turning.

12. The belt type continuously variable transmission according to claim 1, wherein the secondary sheave has a spiral groove or a plurality of coaxial circular grooves.

13. The belt type continuously variable transmission according to claim 12, wherein a pitch between neighboring grooves is equal to or less than 0.1 mm.

14. A straddle type vehicle comprising the belt type continuously variable transmission according to claim 1.

15. The straddle type vehicle according to claim 14, further comprising:
 a front wheel and a rear wheel, wherein
  the primary sheave and the secondary sheave are disposed between an axis of the front wheel and an axis of the rear wheel in a fore to aft direction of the vehicle.

16. The belt type continuously variable transmission according to claim 1, wherein the V-belt is formed by resin blocks coupled by rubber coupling members.

17. The belt type continuously variable transmission according to claim 16, wherein the resin blocks have a trapezoidal shape.

* * * * *